2,996,478
POLYVINYL FLUORIDE RESINS STABILIZED WITH AN ALKALI METAL FORMATE

Harry Bowman West, Wilmington, Del., assignor to E. I. du Pont de Nemours and Company, Wilmington, Del., a corporation of Delaware
No Drawing. Filed Feb. 7, 1958, Ser. No. 713,790
11 Claims. (Cl. 260—45.85)

This invention relates to compositions containing polyvinyl fluoride and particularly to compositions from which improved shaped structures may be prepared.

Polyvinyl fluoride, particularly in the form of self supporting films or as part of laminates, etc., displays a combination of excellent properties. Weatherability (resistance to degradation when exposed to outdoor conditions), pliability, strength (flexural, tensile and tear), etc. are all well within the desirable ranges. However, the thermal stability of polyvinyl fluoride (the ability to withstand temperatures in the vicinity of its melting point) is relatively poor. The polymer degrades rapidly at its melting temperature. Degradation is evidenced by the normally white polymer first turning brown (discoloration) and then becoming progressively darker until charring (decomposition) occurs. Lack of thermal stability is a serious obstacle to the commercial exploitation of the polymer. Melt extrusion techniques, the conventional techniques for forming self-supporting films and other shaped structures, cannot be used successfully with polyvinyl fluoride. Laminating procedures, which are customarily performed at extremely elevated temperatures, are also exceedingly difficult to accomplish when polyvinyl fluoride is involved.

It is an object of the present invention to improve the thermal stability of polyvinyl fluoride compositions. A further object is a polyvinyl fluoride composition capable of successful extrusion in molten form to form useful shaped structures. Other objects will appear hereinafter.

The objects are accomplished by a composition comprising polyvinyl fluoride and a small amount of an alkali metal formate. The preferred composition is a polyvinyl fluoride polymer containing 0.01–1% by weight, based on the weight of the polymer, of the alkali metal formate. It has been found, however, that as little as 0.0005% of the formate will provide some improvement in the thermal stability of the polymer. The use of 0.5% and above of the formate detracts somewhat from the clarity of the resulting polyvinyl fluoride structure. However, where a haze is not objectionable as in most laminates, etc., the use of 0.5% and above of the formate is quite acceptable. Although amounts greater than 1% can be used, the thermal stability of the polymer for most uses is sufficiently improved with amounts up to 1%.

The polyvinyl fluoride useful in the present invention may be orientable polyvinyl fluoride or nonorientable polyvinyl fluoride. Orientable polyvinyl fluoride may be prepared by any of the methods disclosed in U.S. Patents 2,419,008; 2,419,010; 2,510,783; 2,599,299 and 2,599,300. For example, vinyl fluoride may be subjected to a pressure of at least 150 atmospheres in the presence of an organic peroxy compound and at an elevated temperature as in U.S. Patent 2,419,010 to provide the orientable polyvinyl fluoride. Orientable polyvinyl fluoride is preferred for use in the present invention, particularly orientable polyvinyl fluoride having a substantially high molecular weight. The average level of molecular weight is directly related to the inherent viscosity of the polymer. For the present invention it is preferred that the orientable polyvinyl fluoride have an inherent viscosity of at least 1.0 and for the preparation of self-supporting films, an inherent viscosity from 2.5 to 4.5.

Inherent viscosity is measured by first dissolving the polyvinyl fluoride in hexamethylphosphoramide by agitation at an elevated temperature. The flow of this solution and the flow of the solvent alone through a standard viscosimeter at 30° C. are measured. The inherent viscosity is determined from the equation:

$$\text{Inherent viscosity} = \frac{\log_e \frac{t_1}{t_2}}{C}$$

where
$t_1$ is the flow time in seconds for the solution
$t_2$ is the flow time in seconds for the solvent alone
$C$ is the concentration of polymer expressed in grams of polymer per 100 milliliters of solution (unless otherwise stated, 0.05 gram/100 milliliters was used for all determinations in this specification).

The alkali metal formate for use in the present invention is preferably selected from the group consisting of sodium formate, potassium formate and lithium formate. For convenience, it is preferred to add the formate in the form of an aqueous solution to an aqueous dispersion of polyvinyl fluoride. The amount of the formate used at this stage may vary widely. Since the invention contemplates obtaining a final composition of about 0.01–1.0% of the formate, based on the weight of polyvinyl fluoride in the composition, and since some of the processing operation such as filtration and washing tend to remove formate, the amount used at this statge may be above 1.0% and may be as high as 10%. Usually the concentration of the formate in the aqueous solution is about ten times its concentration in the final composition based on the weight of polyvinyl fluoride. After agitation to blend in the formate, the dispersion is filtered. The filter cake obtained, containing polyvinyl fluoride and the formate, may be redispersed in water, refiltered and then finally dried to form the composition of the present invention.

Other methods may also be used to blend the formate into the polyvinyl fluoride. The formate may be added in the form of a micropulverized solid to an aqueous dispersion of the polyvinyl fluoride. Alternatively, the formate may be incorporated into polyvinyl fluoride compositions by dry grinding of the powdered polymer with the formate, or by wet grinding as in a ball mill in the presence of water or organic liquids, or by milling together on a heated rolling mill, or by working together as in a Banbury mixer. It is understood that for the purposes of the present invention the formate may be incorporated in the polyvinyl fluoride composition by any suitable means familiar to those skilled in the art.

The following examples illustrate specific embodiments of the present invention and are not intended to be limitative. Percentages expressed in the examples are by weight unless otherwise specified.

EXAMPLE I

Orientable polyvinyl fluoride having an inherent viscosity of 3.03 was dispersed in water to the extent of 21%. An aqueous solution containing 1% sodium formate was added to the polyvinyl fluoride dispersion until the ratio of sodium formate-to-polyvinyl fluoride was 1–100, in other words, 1% sodium formate based on the weight of polyvinyl fluoride. The resulting mixture was agitated briefly and then filtered. The filter cake was removed from the filter, redispersed in fresh water and refiltered to provide a cake containing approximately 50% liquid. The cake was then spread on trays and the trays placed for 16 hours in a vacuum oven maintained at a temperature of 70° C. and a vacuum of 15–20 millimeters of mercury. The dried composition contained polyvinyl fluoride and approximately 0.1% sodium formate.

Five one-gram samples of the composition were tested by placing each sample in a pellet press wherein it was compressed to form a circular disc about 1" in diameter. Each 1" polyvinyl fluoride-sodium formate disc was placed in the center of a 6" square ferrotype plate. Another ferrotype plate was placed over the disc and the "sandwich" was pressed in a platen press maintained at a temperature of 255° C. A load of 12,000 pounds was applied for 5 minutes. At the end of this period, the plates were quickly removed from the press and thrust into cold water. The resulting polyvinyl fluoride-sodium formate film discs were substantially colorless and displayed substantially little charring.

As controls, five similar samples were prepared from polyvinyl fluoride alone (no sodium formate was blended into the composition) and were tested in a manner identical to that described above. The resulting film discs were all exceedingly charred.

EXAMPLE II

Orientable polyvinyl fluoride having an inherent viscosity of 3.52, was blended with sodium formate following the identical procedure described in Example I to provide a composition of polyvinyl fluoride and approximately 0.1% sodium formate. Film discs prepared from the composition as in Example I, when subjected to a temperature of 255° C. as in Example I, were substantially colorless and showed very little charring. Film discs prepared from the polyvinyl fluoride alone, the controls, were all substantially charred when subjected to the same conditions.

EXAMPLE III

A polyvinyl fluoride dispersion, prepared as in Example I from orientable polyvinyl fluoride having an inherent viscosity of 2.7, was mixed with an aqueous solution containing 10% potassium formate to provide a ratio of potassium formate-to-polyvinyl fluoride of 2–100, in other words, 2% based on the weight of polyvinyl fluoride. Filtration, washing, redispersion, refiltration and drying followed the general procedure described for Example I to provide a dried composition containing polyvinyl fluoride and about 0.05% potassium formate. Film discs prepared from the composition as in Example I after being subjected to a temperature of 255° C. as in Example I, were substantially colorless and showed very little charring. Film discs prepared from the polyvinyl fluoride alone, the controls, were all exceedingly charred when subjected to the same conditions.

EXAMPLE IV

A polyvinyl fluoride dispersion, prepared from orientable polyvinyl fluoride having an inherent viscosity of 4.1, was mixed with an aqueous solution containing 10% lithium formate to provide a ratio of lithium formate-to-polyvinyl fluoride of 4.5–100, in other words, 4½% based on the weight of polyvinyl fluoride. Following two complete cycles of filtration, washing and redispersion, the dispersion was refiltered and dried following the procedure described for Example I to provide a dried composition containing polyvinyl fluoride and approximately 0.03% lithium formate. Film discs prepared from the composition as in Example I after being subjected to a temperature of 255° C. as in Example I, were substantially colorless and showed very little charring. Film discs prepared from the polyvinyl fluoride alone, the controls, were all exceedingly charred when subjected to the same conditions.

EXAMPLE V

A polyvinyl fluoride dispersion, prepared from orientable polyvinyl fluoride having an inherent viscosity of 3.7, was mixed with an aqueous solution containing 10% sodium formate to provide a ratio of sodium formate-to-polyvinyl fluoride of 2–100, in other words, 2% based on the weight of polyvinyl fluoride. After filtration, the filter cake was dried following the procedure described for Example I to provide a dried composition containing polyvinyl fluoride and about 0.5% sodium formate. Film discs prepared from the composition as in Example I after being subjected to a temperature of 255° C. as in Example I, were white and hazy and showed no discoloration or charring. Film discs prepared from the polyvinyl fluoride alone, the controls, were all exceedingly charred when subjected to the same conditions.

From the foregoing examples, the importance of the present invention in imparting thermal stability at very high temperatures to an otherwise unstable polymer is apparent. The melt-pressing technique used in the examples simulates the combined affect of heat and pressure in the absence of air present in melt extrusion and laminating operations.

Another important advantage of the present invention was quite unexpected. Films formed from the compositions of the present invention at temperatures where polyvinyl fluoride remains substantially thermal-stable display a marked improvement in weatherability over films prepared from polyvinyl fluoride alone. The weatherability of films prepared from the compositions of Examples I–IV above is compared to that of films prepared from the control compositions in Table 1 below.

*Table 1*

WEATHERABILITY OF FILMS PREPARED FROM THE COMPOSITIONS OF EXAMPLES I–IV

| Example | Weatherability of Example (hours) | Weatherability of Comparable Control (hours) |
|---|---|---|
| I | 870 | 540 |
| II | 430 | 290 |
| III | 655 | 420 |
| IV | 930 | 580 |

The films in Table 1 were prepared by first mixing approximately 40 parts of the polymer composition in 60 parts of gamma-butyrolactone. This mixture was charged into a water-jacketed stainless steel cylinder fitted near its base with a screened orifice (200–300 mesh). Centrally located within the cylinder was a rotatable shaft (½" diameter), upon which were mounted three discs (¼" thick). The shaft was connected to an electric motor (⅓ horsepower). Approximately one kilogram of carefully washed and dried "Ottawa sand" (20–30 mesh) occupied about ⅓ of the free space in the cylinder. The shaft was rotated at 1800 revolutions per minute for about ten minutes to provide an intimate mixture of the ingredients. The ingredients flowed downwardly toward the orifice. The sand was restrained on the fine mesh screen and the emerging smooth, agglomerate-free dispersion of the polymer composition was delivered into a receiver. Cooling water circulated through the jacket of the cylinder to maintain the temperature within the cylinder at approximately 25° C. The dispersion was deaerated within the receiver by subjecting it to a high vacuum for about four hours. The dispersion was then spread on a ferrotype plate to a thickness of about 30 mils. The plate was placed on a hot plate maintained at 180°–190° C. and the entire assembly was placed under a bank of radiant heaters. The dispersion coalesced into a transluscent gel film within 30–60 seconds. After coalescence, the ferrotype plate with the gel film thereon was exposed to the circulation of air in an oven maintained at about 180° C. to volatilize a major portion of the gamma-butyrolactone. The plate was then removed from the oven, quenched in cold water and the film was stripped from the surface of the plate. The film was then clamped in a frame and deposited in a forced air circulation oven maintained at 180° C. for another 5 minutes to volatilize substantially all of the remaining gamma-butyrolactone. The film was removed from the oven, again quenched in cold water, and removed from the frame.

Several strips of each film sample were tested for weatherability. This test consisted in mounting the film strips in an artificial weathering device wherein the strips were exposed to intense ultra-violet radiation in an atmosphere containing ozone at a temperature of 45–50° C. At intervals, strips were removed and subjected to 180-degree folding by hand. The weatherability was determined as the number of hours the film was exposed to the above conditions before a sample strip cracked and/or broke upon being folded.

Although compositions of orientable polyvinyl fluoride and the alkali metal formate are preferred, the invention is not so limited. The improvements of the present invention are obtained whenever polyvinyl fluoride, orientable or non-orientable, is present in chemical and/or physical association with other materials. Thus, interpolymers of vinyl fluoride and dissimilar polymerizable materials may be improved by blending in the alkali metal formate. Among the dissimilar polymerizable materials may be mentioned vinyl chloride, ethylene, tetrafluoroethylene, etc. As a general rule, interpolymers of vinyl fluoride and other vinyl (ethylene linkage containing) polymerizable materials are preferred. In general, the vinyl fluoride content of the ultimate composition should be at least 50% by weight to obtain the optimum effect from the use of the alkali metal formate.

The polyvinyl fluoride or interpolymer of vinyl fluoride, besides being blended with the formate in accordance with the present invention, may also be admixed physically with other resins, plasticizers, pigments, fillers and the like to achieve special affects in the ultimate produced shaped structure.

Among the structures in which the compositions of the present invention find utility are self-supporting films, foils, sheets, ribbons, bands, rods, tubing and molded objects, as coatings and in laminates, as fibers or filaments, etc.

What is claimed is:

1. A heat-stable composition for forming shaped structures consisting essentially of orientable polyvinyl fluoride having an inherent viscosity of at least 1.0 and 0.01–1%, based on the weight of the polyvinyl fluoride, of a thermal stabilizing material dispersed therein, said thermal stabilizing material being solely an alkali metal formate.

2. A composition as in claim 1 wherein said alkali metal formate is sodium formate.

3. A composition as in claim 1 wherein said alkali metal formate is potassium formate.

4. A composition as in claim 1 wherein said alkali metal formate is lithium formate.

5. A composition as in claim 1 wherein the orientable polyvinyl fluoride has an inherent viscosity of 2.5–4.5.

6. A heat-stable composition for forming shaped structures consisting essentially of a polymer obtained from at least 50% by weight of vinyl fluoride with at least one other polymerizable monomer copolymerizable therewith and 0.01–1%, based on the weight of the polymer, of a thermal stabilizing material dispersed therein, said thermal stabilizing material being solely an alkali metal formate.

7. A process for forming shaped structures which comprises melting a polymeric composition consisting essentially of orientable polyvinyl fluoride having an inherent viscosity of at least 1.0 and 0.01–1%, based on the weight of the polyvinyl fluoride, of a thermal stabilizing material to produce a molten composition, said thermal stabilizing material being solely an alkali metal formate and forming said molten composition into a shaped structure.

8. A process as in claim 7 wherein the alkali metal formate is sodium formate.

9. A process as in claim 7 wherein the alkali metal formate is lithium formate.

10. A process as in claim 7 wherein the alkali metal formate is potassium formate.

11. A process for forming shaped structures which comprises heating to a temperature of at least 255° C. a composition consisting essentially of orientable polyvinyl fluoride having an inherent viscosity of at least 1.0 and 0.01–1%, based on the weight of the polyvinyl fluoride, of a thermal stabilizing material to form a molten composition, said thermal stabilizing material being solely an alkali metal formate and forming said molten composition into a self-supporting film.

References Cited in the file of this patent

UNITED STATES PATENTS

| | | |
|---|---|---|
| 2,181,478 | Kligor | Nov. 28, 1939 |
| 2,476,606 | Johnston et al. | July 19, 1949 |
| 2,479,957 | Newkirk | Aug. 23, 1949 |
| 2,507,142 | Chaban | May 9, 1950 |